United States Patent

Grajewski et al.

[11] Patent Number: 5,956,230
[45] Date of Patent: Sep. 21, 1999

[54] DEVICE FOR HOUSING THE ACTIVE AND PASSIVE NODAL POINT MODULES OF TELECOMMUNICATION INSTALLATIONS

[75] Inventors: Franz Grajewski; Werner Stieb, both of Stadthagen, Germany

[73] Assignee: Alcatel Alsthom Compagnie Generale d'Electicite, France

[21] Appl. No.: 08/798,595

[22] Filed: Feb. 11, 1997

[30] Foreign Application Priority Data

Feb. 14, 1996 [DE] Germany ............ 296 02 552 U

[51] Int. Cl.⁶ .................................................. H05K 7/20
[52] U.S. Cl. ................... 361/707; 174/37; 361/721; 52/20
[58] Field of Search ............... 220/3.4, 3.7, 3.8; 174/37, 51, 65 R; 52/19, 20, 169.1, 169.6, 169.11, 245; 165/80.3, 185; 361/807, 869, 810, 826, 827, 831, 600, 601, 622, 641, 652, 704, 707, 710, 715, 716, 724–729, 720, 721

[56] References Cited

U.S. PATENT DOCUMENTS

| | | |
|---|---|---|
| 1,044,417 | 11/1912 | Raggio . |
| 2,247,936 | 7/1941 | Bishop . |
| 2,828,762 | 4/1958 | Swank . |
| 3,377,487 | 4/1968 | McNulty . |
| 3,482,108 | 12/1969 | Steinmayer . |
| 3,503,025 | 3/1970 | Weinfurt . |
| 3,672,103 | 6/1972 | Kost . |
| 4,149,219 | 4/1979 | Kraft .......................... 361/721 |
| 4,542,437 | 9/1985 | Ellis ............................ 361/721 |
| 4,655,361 | 4/1987 | Clover et al. . |
| 4,659,251 | 4/1987 | Petter et al. . |
| 5,117,877 | 6/1992 | Sharp . |
| 5,147,980 | 9/1992 | Ferguson . |
| 5,722,204 | 3/1998 | Stieb ............................ 52/20 |

FOREIGN PATENT DOCUMENTS

| | | |
|---|---|---|
| 873579 | 6/1971 | Canada . |
| 1586162 | 2/1970 | France . |
| 2693320 | 1/1994 | France . |
| 1634624 | 11/1970 | Germany . |
| 2118372 | 10/1972 | Germany . |
| 7812489 | 8/1978 | Germany . |
| 1949694 | 9/1979 | Germany . |
| 3322584 | 11/1983 | Germany . |
| 3150166 | 9/1984 | Germany . |
| 3714343 | 12/1988 | Germany . |
| 4140701 | 12/1992 | Germany . |
| 9402158 | 5/1994 | Germany . |
| 9410777 | 10/1994 | Germany . |
| 4315275 | 11/1994 | Germany . |
| 9419491 | 3/1995 | Germany . |
| 29502938 | 5/1995 | Germany . |

OTHER PUBLICATIONS

DIN 4290, Apr.1963, S.1–4.

Primary Examiner—Gerald P. Tolin
Attorney, Agent, or Firm—Ware, Fressola, Van der Sluys & Adolphson LLP

[57] ABSTRACT

A device which houses the active and passive nodal point modules of telecommunication installations in the ground comprises a metal container with a removable cover and a removable support for the modules housed in the container. The modules are attached in a heat-conductive manner to the internal surface of the support. The support is made of heat-conductive material and its external surface has a number of cooling fins. Through the cooling fins, the support makes heat-conductive contact with the internal surface of the container.

9 Claims, 2 Drawing Sheets

DEVICE FOR HOUSING THE ACTIVE AND PASSIVE NODAL POINT MODULES OF TELECOMMUNICATION INSTALLATIONS

BACKGROUND OF THE INVENTION

1. Technical Field

The invention concerns a device for housing the active and passive nodal point modules of telecommunication installations in the ground. The device comprises a metal container having a removable cover thereon and a removable support for the modules therein.

2. Description of the Prior Art

A temperature problem often arises with the above-ground installation of electronic components in the usual housings, due to the dissipation of power by the components and the high ambient temperatures when the housing is warmed by the sun's radiation. In addition, temperature differences between night and day can form condensation inside the container.

Both humidity and high temperatures can lead to temporary or even permanent malfunction of the electronic components.

A cooling system for communication devices with high power dissipation is known from DE-PS 31 50 166, in which the communication devices are housed in a container made of a very heat-conductive material installed in the ground, so that good heat dissipation takes place. The communication devices are connected in a heat-conductive manner to the wall of the container. Additional cooling is provided by a tubing system filled with a coolant, wherein the liquid circulates due to temperature and density differences alone.

This container has a number of disadvantages. First, it is very heavy and therefore expensive. Second, the communication devices are hard to access when it is necessary for work to be performed on the communication devices. Furthermore, the tubing system significantly increases the manufacturing cost and the installation work.

An underground container with a removable holder for the electronic components is known from DE-GM 295 02 938. The container is preferably made of steel, so that a large portion of the heat generated by the components can be dissipated into the surrounding ground via heat conduction. The transmission of heat from the components to the container wall takes place mostly through convection. However, this type of heat dissipation is insufficient when the container is densely filled with the components

SUMMARY OF THE INVENTION

It is an object of the invention to considerably improve the dissipation of the waste heat generated by the communications devices housed within an underground container device.

This object is fulfilled by a device for housing the active and passive nodal point modules of telecommunication installations in the ground, which comprises a metal container with a removable cover and a removable support housed in the container for the modules. Optimum heat dissipation is achieved by making the module support of a heat-conductive material. The modules make a heat-conductive contact with the support and the support contacts the container through its cooling fins. Thus, in addition to heat dissipation through convection, it also takes place through heat conduction. This ensures that nearly the same temperature prevails inside the container at all times.

In accordance with the invention, the support can be a hollow body having a cross section that forms a rectangular empty space and can be made of metal, preferably aluminum. The support comprises two halves which are interconnected by a hinge-type joint and the halves can be secured by a locking mechanism to close the support. The halves of the support are at least partially formed by means of extrusion molding.

Conveniently, the modules are attached to both halves of the support. The modules are screwed or plugged into the internal surface of the support.

Ideally, the cooling fins run vertically and nearly their full length contacts the internal wall of the container. The cooling fins are arranged on at least two opposite wall parts of the support and the ends of the cooling fins form a circular path whose radius matches the internal radius of the container, which has a circular cross section.

The invention will be fully understood when reference is made to the following detailed description taken in conjunction with the accompanying drawings.

DETAILED DESCRIPTION OF THE INVENTION

The container 6 is a hollow body preferably having a rotationally symmetric configuration. In its preferred configuration, it is made of cast iron, but other types of manufacture can be envisioned, such as cast aluminum.

Figure 2:
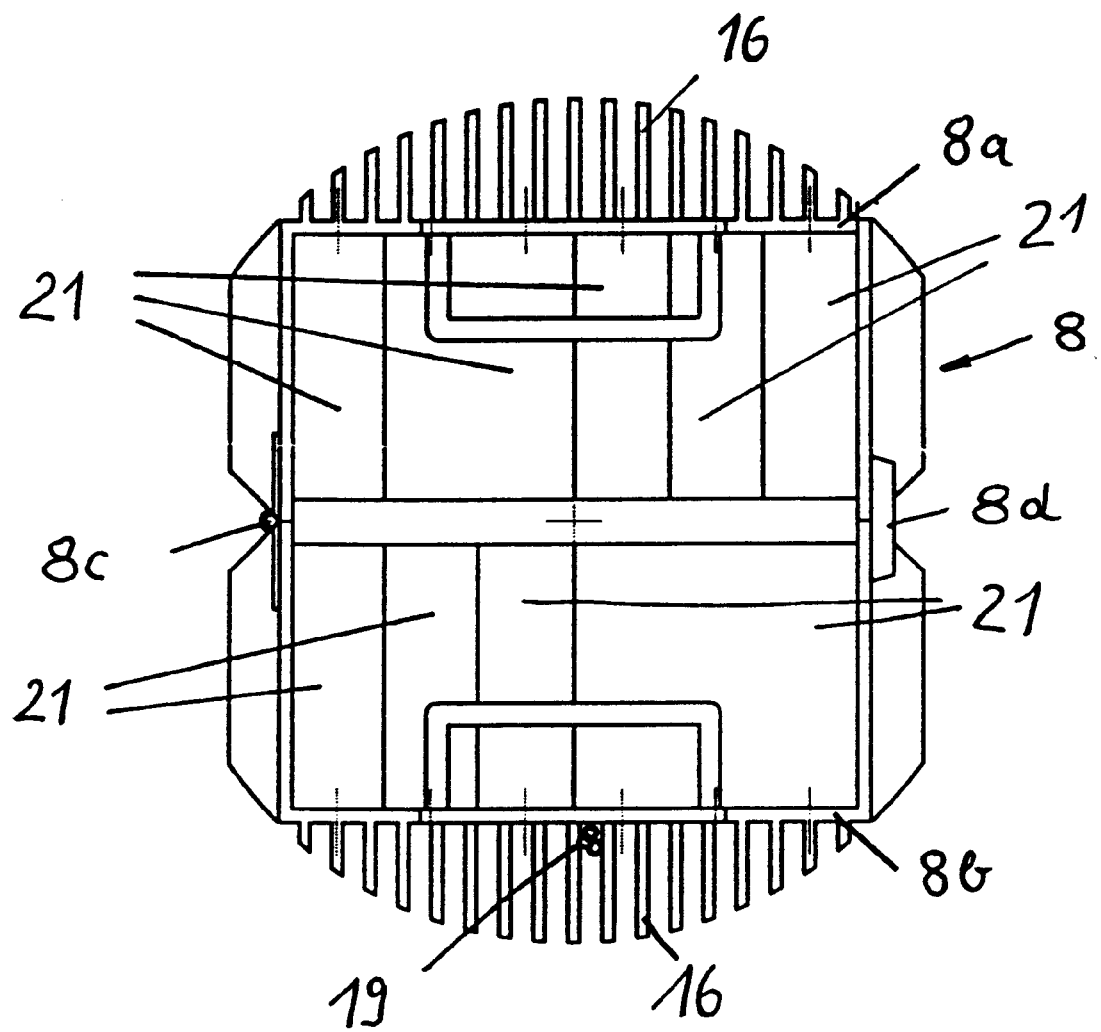
FIG. 2 is a schematic top plan view of the support used in the device of FIG. 1.

Located inside of the container 6 is a hollow support 8 used to receive electronic modules 21 (FIG. 2).

A circumferential bead 4 also forms a part of the container 6. The advantage of this bead 4 will be explained further hereinafter.

The upper edge of the container 6 has a first enlargement 10 with a circumferential annular groove 12 and a second enlargement 11 which also contains a circumferential annular groove 13. Both annular grooves 12 and 13 contain a not further described seal in the form of a sealing ring. However, each respective seal can also be located in a annular groove in the corresponding cover.

Figure 1:
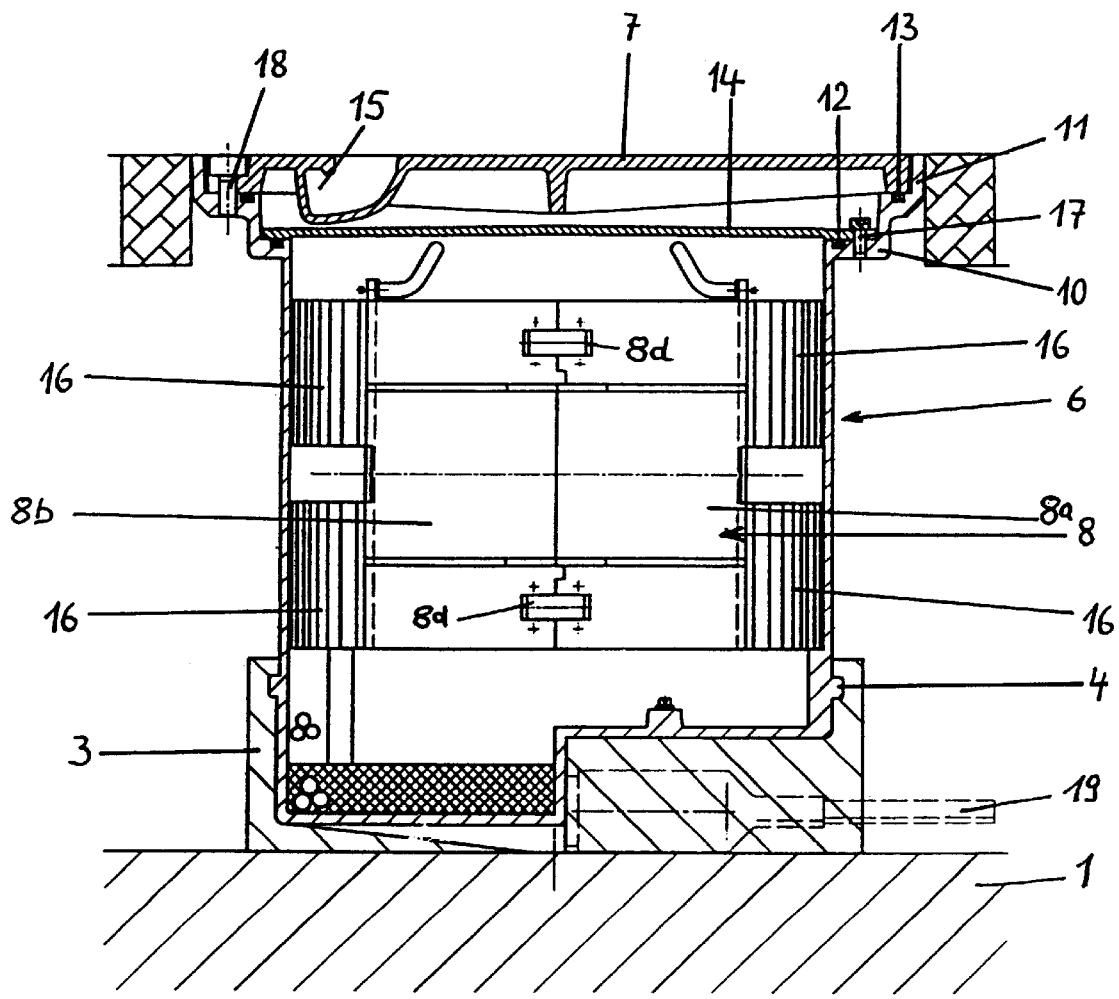
FIG. 1 is a schematic cross-sectional view of a device made in accordance with the present invention for housing active and passive nodal point modules.

A grey-cast iron cover 14 is seated on the enlargement 10 to which it is attached by means of threaded bolts 17 (only one shown in FIG. 1).

The cover 14 in conjunction with the seal in the annular groove 12 and the threaded bolts 17 ensure that the container 6 is pressure-sealed and reliably maintains an internal pressure of 0.05 to 1.5 bar.

The pavement cover 7 is seated on the second enlargement 11 to which it is secured by threaded bolts 18 (only one shown in FIG. 1), and seals the container 6 against moisture by means of the seal in the annular groove 13. A hand grip depression 15 in the pavement cover 7 facilitates lifting the cover 7. The pavement cover 7 is designed to fit without protruding above the pavement surface.

The installation of the underground container takes place as follows: First, a base 1, e.g. of lean concrete, is cast to a specified depth. After the lean concrete has hardened, a type of spring form mold is placed on the base 1. The spring form has several not illustrated threaded rods evenly distributed around the circumference, to the free ends of which the pavement cover 7 is secured. Different height adjustments of the pavement cover's bearing surface make possible its adaptation to the pavement with respect to height and inclination. The cable 19 is radially inserted into the container 6 and the insertion is sealed on the outside. The cable 19 is usually a bundle of a conventional communication cable, a power supply cable and an optical fiber cable.

It is advantageous if the insertion of the cable 19 into the container 6, and the sealing by means of a well known heat shrinkable sleeve or a distribution cap, takes place at the factory so that a premanufactured container 6 can be delivered, and its cable 19 is connected to the existing cables at the installation site.

After the container 6 is attached to the spring form mold by means of the threaded rods, a mortar bed 3 is cast which secures the container 6. The circumferential bead 4 reinforces the connection between the container 6 and the mortar bed 3.

Several turns of the cable 19 or the bared cable cores are stored in the lower portion of the container 6 so that the support 8 carrying the modules 21 (FIG. 2) can be removed from the container 6 to take measurements during troubleshooting.

The two covers 14 and 7 are finally installed and the excavation is filled with sand.

The support 8 is illustrated separately in FIG. 2. The support 8 comprises two halves 8a and 8b, which are interconnected in foldable form by a hinge-type joint 8c. In the closed position, the halves 8a and 8b can be secured by means of a locking mechanism 8d.

The inside of each half 8a and 8b has a number of cooling fins 16 whose ends form a circular path which in the installed condition makes contact with the internal wall of container 6.

Each of the halves 8a and 8b and their cooling fins 16 can be made of aluminum by means of joint extrusion molding. A welded construction can also be envisioned.

The cooling fins 16 are interrupted approximately in the center of the support 8 (see FIG. 1). This is where the cable 19 is connected in a way that is known from the so-called 19"-technique. The cable 19 is inserted in this area between two cooling fins 16. According to the 19"-technique, the electronic modules 21 are attached to the internal surface of the halves 8a and 8b by means of plugs (not illustrated). The plugs provide the electrical contact as well as the simultaneous heat conduction from the modules 21 to the halves 8a and 8b.

The preferred embodiment described above admirably achieves the objects of the invention. However, it will be appreciated that departures can be made by those skilled in the art without departing from the spirit and scope of the invention which is limited only by the following claims.

What is claimed is:

1. A device for housing the active and passive nodal point modules of telecommunication installations in the ground, comprising:
   (a) a metal container;
   (b) a removable cover on the container;
   (c) a removable support in the container, the support made of heat-conductive material, the support having a plurality of cooling fins on an external surface, and the support being in heat-conductive contact with an internal surface of the container through the cooling fins, the support comprises two halves which are interconnected by a hinge-type joint and the halves can be secured by a locking mechanism to close the support; and
   (d) modules attached in a heat-conductive manner to the internal surface of support.

2. A device as claimed in claim 1, wherein the modules are attached to both halves of the support.

3. A device for housing the active and passive nodal point modules of telecommunication installations in the ground, comprising:
   (a) a metal container;
   (b) a removable cover on the container;
   (c) a removable support in the container, the support made of heat-conductive material, the support having a plurality of cooling fins on an external surface, and the support being in heat-conductive contact with an internal surface of the container through the cooling fins, the cooling fins run vertically and nearly their full length contacts the internal surface of the container; and
   (d) modules attached in a heat-conductive manner to the internal surface of support.

4. A device as claimed in claim 1, wherein the cooling fins are arranged on at least two opposite walls of the support and ends of the cooling fins form a circular path whose radius matches an internal radius of the container, which has a circular cross section.

5. A device as claimed in claim 1, wherein the support is a hollow body having a cross section that forms a rectangular empty space.

6. A device as claimed in claim 5, wherein the cooling fins are arranged on at least two opposite walls of the support and ends of the cooling fins form a circular path whose radius matches an internal radius of the container, which has a circular cross section.

7. A device as claimed in claim 1, wherein the support is made of metal.

8. A device as claimed in claim 7, wherein the support is at least partially formed by extrusion molded metal.

9. A device as claimed in claim 7, wherein the metal is aluminum.

* * * * *

UNITED STATES PATENT AND TRADEMARK OFFICE
CERTIFICATE OF CORRECTION

PATENT NO. : 5,956,230
DATED      : September 21,1999
INVENTOR(S) : Franz Grajewski and Werner Stieb It is certified that error appears in the above-identified patent and that said Letters Patent is hereby corrected as shown below:

On the title page, under Assignee, "d'Electicite" should be --d'Electricite--.

Signed and Sealed this

Second Day of May, 2000

Attest:

Q. TODD DICKINSON

Attesting Officer       Director of Patents and Trademarks